Figure 1:
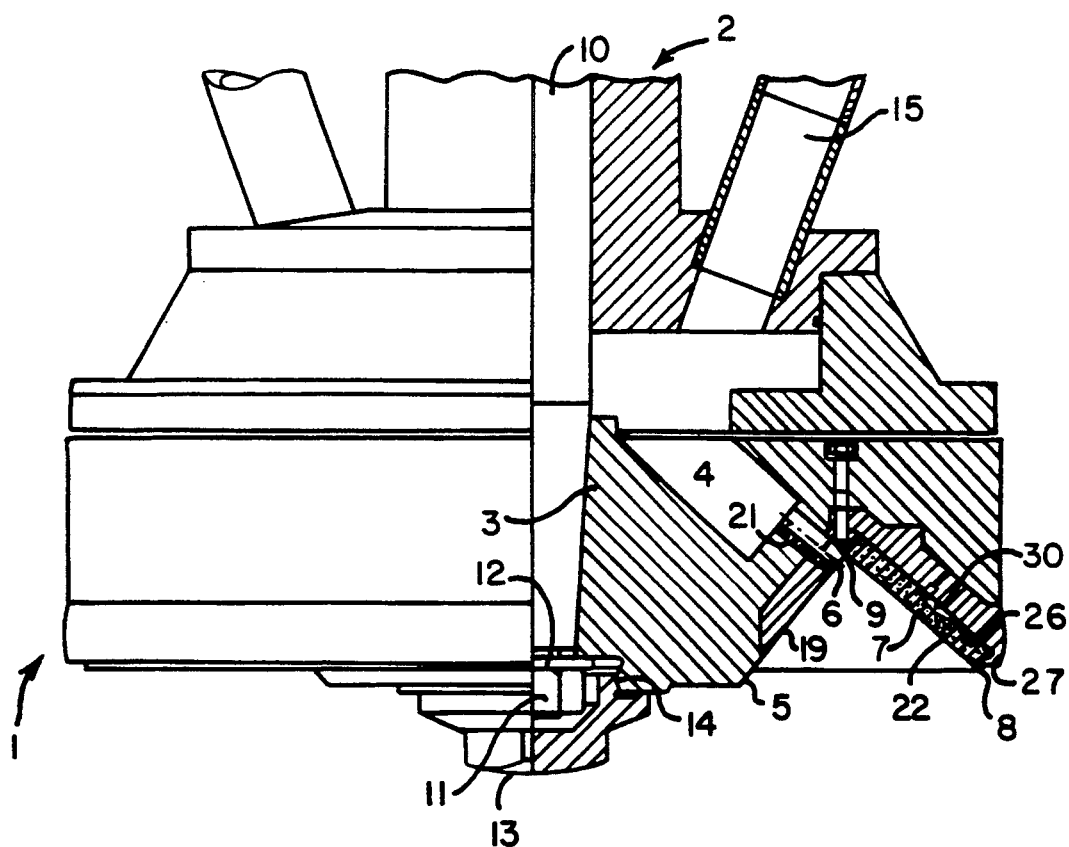

United States Patent [19]

Heide et al.

[11] Patent Number: 5,356,075
[45] Date of Patent: Oct. 18, 1994

[54] ATOMIZER WHEEL WITH A DIVIDED WEAR RING

[75] Inventors: Morten Heide, Kolding; Henrik Sonderby, Helsingor, both of Denmark

[73] Assignee: APV Pasilac Anhydro AS, Soborg, Denmark

[21] Appl. No.: 961,717

[22] Filed: Mar. 19, 1993

[30] Foreign Application Priority Data

Jul. 10, 1990 [DK] Denmark ............... 1658/90
Nov. 1, 1990 [DK] Denmark ............... 2625/90

[51] Int. Cl.⁵ ............ B01D 1/18; B05B 3/10; F26B 5/08
[52] U.S. Cl. .............. 239/222.11; 239/223; 239/224; 239/DIG. 19
[58] Field of Search ............. 239/662, 681, 687, 688, 239/222, 222.11, 223, 224, DIG. 19

[56] References Cited

U.S. PATENT DOCUMENTS

| | | |
|---|---|---|
| Re. 29,083 | 12/1976 | Nielsen . |
| Re. 30,963 | 6/1982 | Moller et al. ............... 239/224 |
| Re. 32,064 | 1/1986 | Nielsen . |
| 2,920,830 | 1/1960 | Nyrop et al. ............... 239/224 X |
| 3,034,730 | 5/1962 | Pilo et al. ............... 239/224 X |
| 3,454,226 | 7/1969 | Nielsen . |
| 3,640,467 | 2/1972 | Moller et al. ............... 239/224 |
| 3,887,133 | 6/1975 | Straaup et al. ............... 239/224 |
| 4,121,770 | 10/1978 | Straarup et al. . |
| 4,141,783 | 2/1979 | Pisecky et al. . |
| 4,303,200 | 12/1981 | Hansen . |
| 4,592,506 | 6/1986 | Capes et al. ............... 239/DIG. 19 X |
| 4,684,065 | 8/1987 | Suarrer ............... 239/224 |
| 4,733,821 | 3/1988 | Jensen et al. . |
| 4,898,331 | 2/1990 | Hansen et al. . |

FOREIGN PATENT DOCUMENTS

| | | |
|---|---|---|
| 145794 | 3/1983 | Denmark . |
| 0035344 | 9/1981 | European Pat. Off. . |
| 0375236 | 6/1990 | European Pat. Off. . |
| 2351491 | 4/1975 | Fed. Rep. of Germany . |
| 2247291 | 5/1975 | France ............... 239/223 |
| 887008 | 12/1981 | U.S.S.R. ............... 239/224 |

*Primary Examiner*—William Grant
*Attorney, Agent, or Firm*—Leydig, Voit & Mayer, Ltd.

[57] ABSTRACT

An atomizer wheel comprising a central hub for securing the wheel on a rotatable shaft in a centrifugal atomizer associated with an atomizer drying system, a ring-shaped acceleration chamber arranged around the hub and having an upper ring opening through which the liquid to be atomized may be added to the acceleration chamber, at least one throw-out face for passing the liquid outwardly in the atomizer wheel in a direction toward its periphery, and a plurality of throw-out channels which, distributed with a mutual angular distance along the periphery of the acceleration chamber, extend transversely out through the outer wall of the chamber and serve to throw the liquid out of the acceleration chamber during the rotation of the atomizer wheel. At least one throw-out face is provided on a separate wear ring which is provided on the atomizer wheel and comprises a hard and wear resistant material. The wear ring is also divided into a plurality of wear elements by cuts that extend from the periphery of the ring substantially in a direction directed to a substantially circular area around the axis of rotation, the cuts extending obliquely forwardly in the direction of rotation from at least one throw-out face of the ring.

21 Claims, 5 Drawing Sheets

ATOMIZER WHEEL WITH A DIVIDED WEAR RING

The invention concerns an atomizer wheel for atomizing in particular abrasive liquids, such as suspensions or dispersions of abrasive materials, in an atomizer drying system, said wheel comprising a central hub for securing the wheel on a rotatable shaft in a centrifugal atomizer associated with the atomizer drying system, a ring-shaped acceleration chamber arranged around said hub and having an upper ring opening through which the liquid to be atomized can be added to the acceleration chamber, one or more throw-out faces for moving the liquid outwardly in the atomizer wheel in a direction toward its periphery, and a plurality of throw-out channels which, distributed with a mutual angular distance along the periphery of the acceleration chamber, extend transversely out through the outer wall of the chamber and serve to throw the liquid out of the acceleration chamber during rotation of the atomizer wheel.

Atomizer wheels of the above-mentioned type are used for processes where a product is to be dried in atomized state. To achieve efficient atomization in this connection, the atomizer wheel must necessarily rotate very rapidly, and it is thus quite ordinary that the velocity of such wheels at the periphery is up to 225 m/sec. and above. These very high velocities entail that when passing the wheel the product tends to wear relatively rapidly in particular the areas which are present adjacent to the throw-out channels on the throw-out face. Of course the rate at which this wear takes place varies much from one product to the other, but is in particular extraordinarily great when suspensions or dispersions of abrasive materials, such as quartz particles or flour, are atomized. The atomizer wheel must therefore be exchanged frequently in these cases, involving great costs, and so far it has not been possible to remedy the above-mentioned wear problems satisfactorily in spite of sustained efforts of finding sufficiently hard-wearing materials for the production of the wheels.

The object of the invention is therefore to provide an atomizer wheel of the type stated in the opening paragraph, which has a longer service length than known before in particular when atomizing abrasive products, and which when worn down can be renovated rapidly and inexpensively.

This is achieved in that the atomizer wheel of the invention is characterized in that at least one of the throw-out faces is provided on a separate preferably plate-shaped wear ring, which is arranged on the atomizer wheel and consists of e.g. a ceramic material, such as SiC or $Al_2O_3$ or a similar hard and wear resistant material, and which is cut through substantially transversely to the peripheral direction of the ring by at least one cut. The throw-out face, which is particularly liable to be worn down by the product to be atomized, is in this way given the excellent wear resistance of the said materials, without the materials, in spite of their poor or absent elongation at break, are burst by the very huge centrifugal forces acting during the rotation.

In a particularly advantageous embodiment of the atomizer wheel of the invention, the wear ring is divided into a plurality of wear elements by cuts extending from the periphery of the ring substantially in a direction directed toward the same point on the axis of rotation or an essentially circular area around said axis, so that the radial extent of each wear element is more-over greater than its greatest width. This effectively protects the wear resistant material against being burst during the rotation of the atomizer wheel.

Further, according to the invention, to avoid obstacles that might impede the flow of the liquid film across the throw-out face, the cut or cuts may extend obliquely forwardly in the direction of rotation from the throw-out face of the ring.

Moreover, according to the invention, to support the wear ring during rotation, the atomizer wheel may have a support face acting against the rear side of the ring and an inwardly directed face acting against the outer peripheral edge of the ring. This entails that the wear elements will only be affected by pressure loads during the rotation, and that they can be replaced easily and rapidly when worn down.

Further, according to the invention, the elements of the wear ring may be loosely arranged in the atomizer wheel, so that the elements automatically assume a correct position in the atomizer wheel during the rotation, without simultaneously being affected by tensile or bending stresses, or the position may be fixed already beforehand, the elements of the wear ring being alternatively kept biassed at any rate at normal room temperature in a direction toward the support face and/or the inwardly facing rim by a clamping means.

Moreover, according to the invention, to secure the positions of the wear elements during e.g. start and stop, the rear side of the cut wear ring may be formed with at least one radially extending Groove which cooperates with a tongue or pin secured in the support face on the atomizer wheel acting against the rear side.

In an advantageous embodiment of the invention, the atomizer wheel may comprise a downwardly and/or inwardly facing wear ring arranged outside the acceleration chamber and having a throw-out face to throw the liquid in a substantially coherent liquid film from the throw-out channels further out for atomization from a peripherally arranged discharge edge on the throw-out face, said face extending inwardly from the discharge edge to an area on the atomizer wheel positioned over the mouths of the throw-out channels.

Furthermore, according to the invention, the inwardly directed face acting against the outer peripheral edge of the wear ring may be provided with an inwardly facing rim which engages with an annular substantially V-shaped cut out, which is provided in the outer peripheral edge of the wear ring and intersects the throw-out face along the discharge edge, said edge being provided at a distance below the lower edge of the rim so that the atomized liquid can freely leave the atomizer wheel via the discharge edge.

Further, in another advantageous embodiment of the invention, the atomizer wheel may comprise a cut wear ring arranged in the acceleration chamber and having a throw-out face facing the upper ring opening, and the inwardly directed face acting against the outer peripheral edge of the ring may be arranged on the inner side of the outer wall of the acceleration chamber, the throw-out face of the wear ring extending substantially from the central hub of the wheel to the inwardly facing end of the throw-out channels.

Finally, according to the invention, the cut wear ring may be composed of a base consisting of a corrosion resistant material, such as stainless steel, and a wear layer applied on the base, said wear layer forming the throw-out face and consisting of an extra hard and wear resistant material, such as silicon carbide, aluminum oxide or tungsten carbide. The wear elements will hereby be particularly inexpensive to produce, while obtaining very great safety against bursts.

Figure 2:
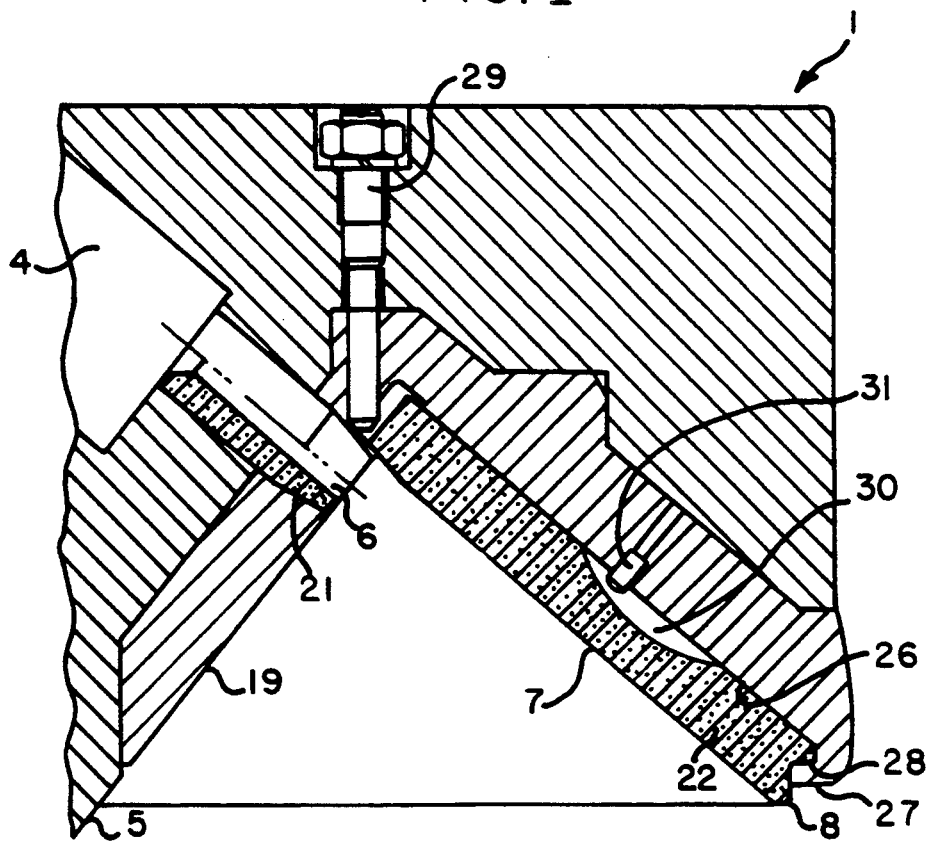
Figure 3:
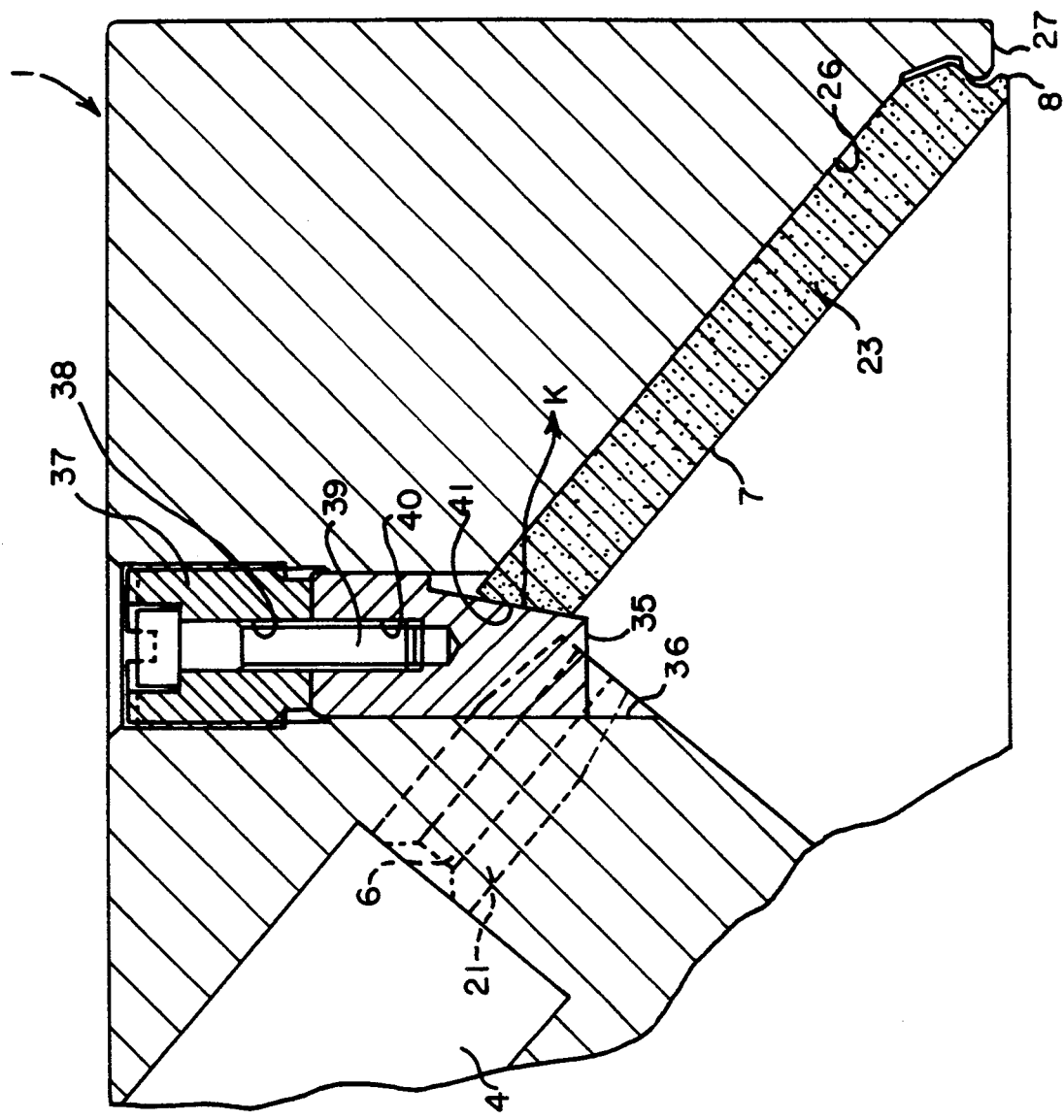
Figure 4:
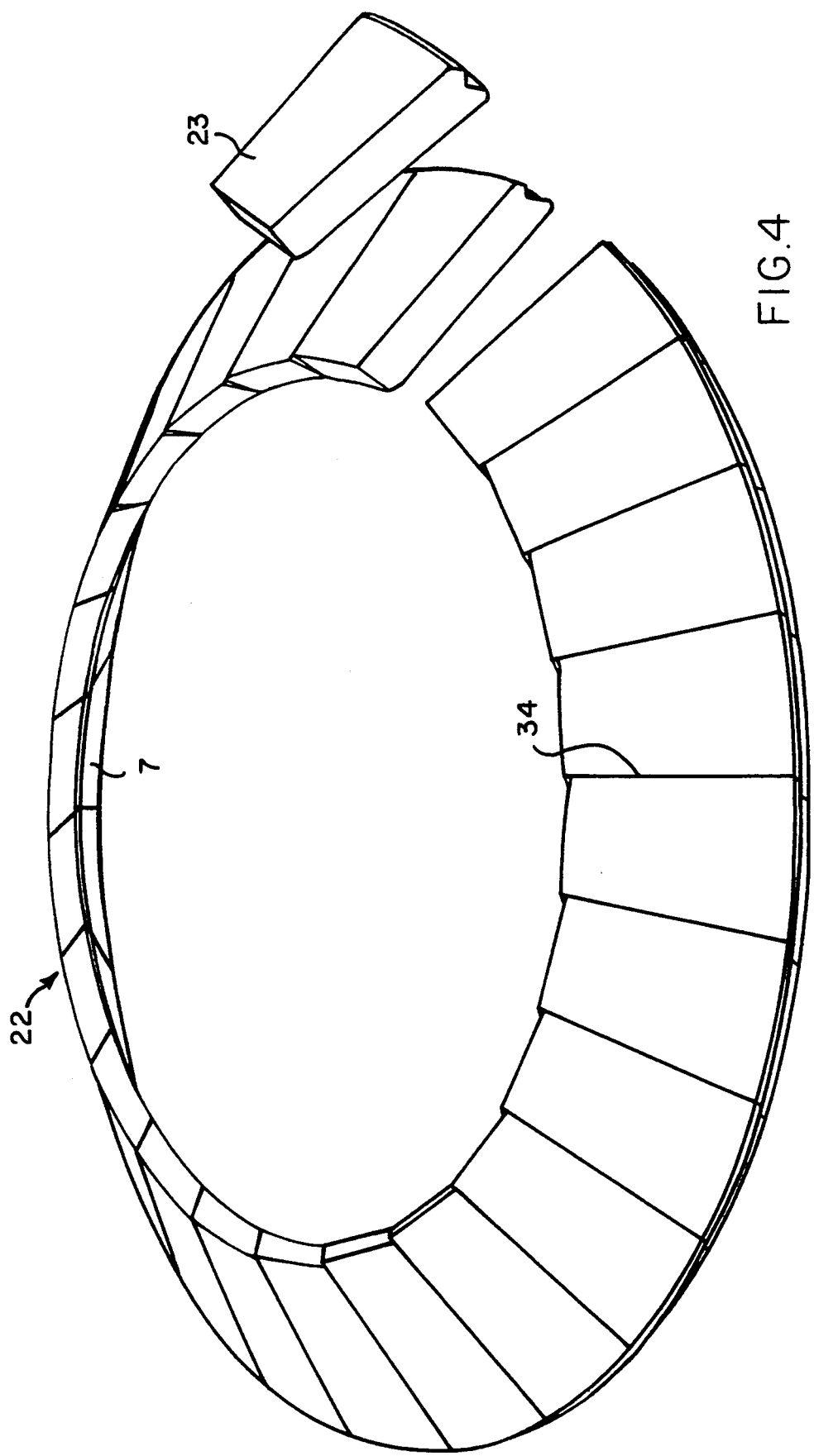
Figure 5:
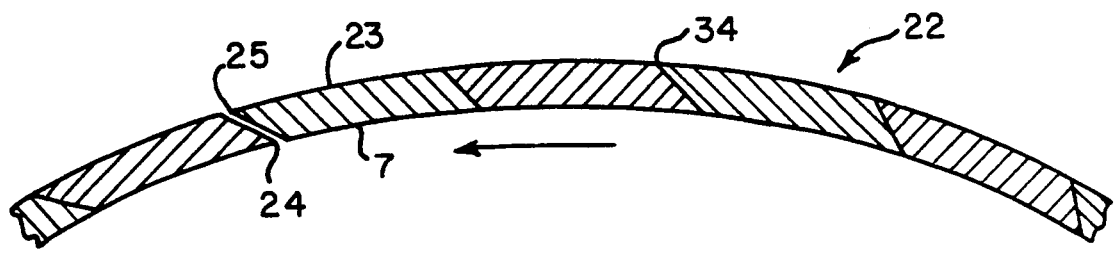
Figure 6:
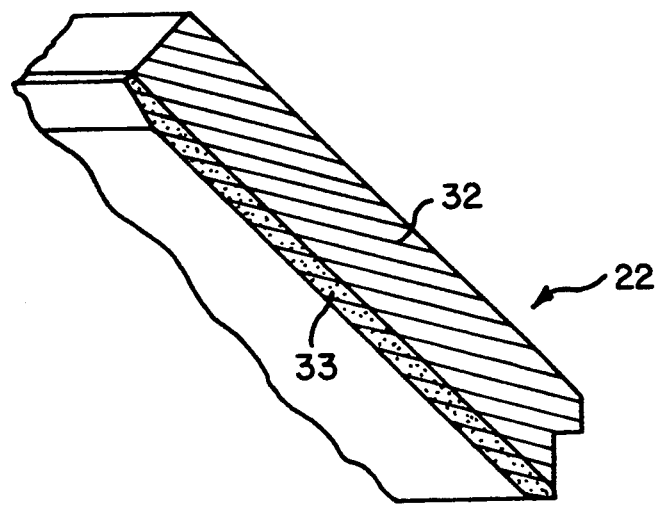
Figure 7:
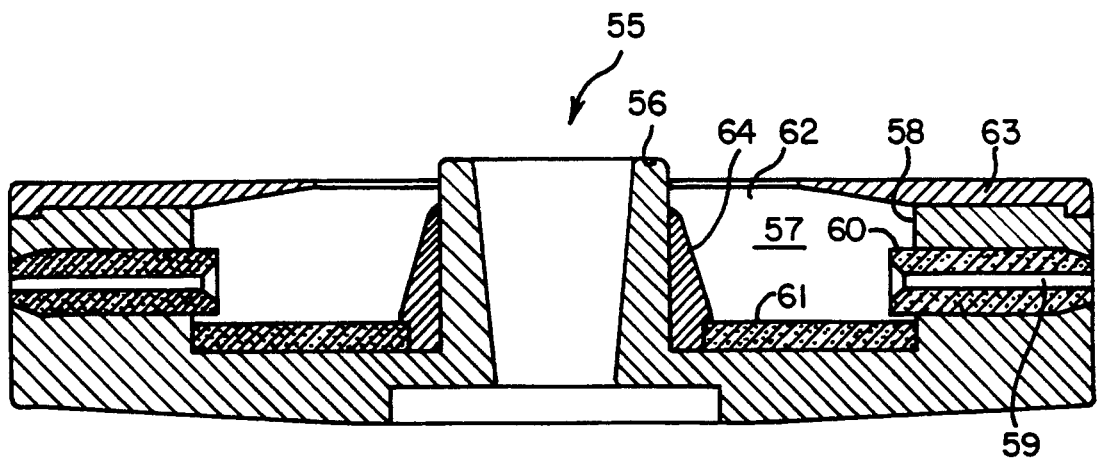
Figure 8:
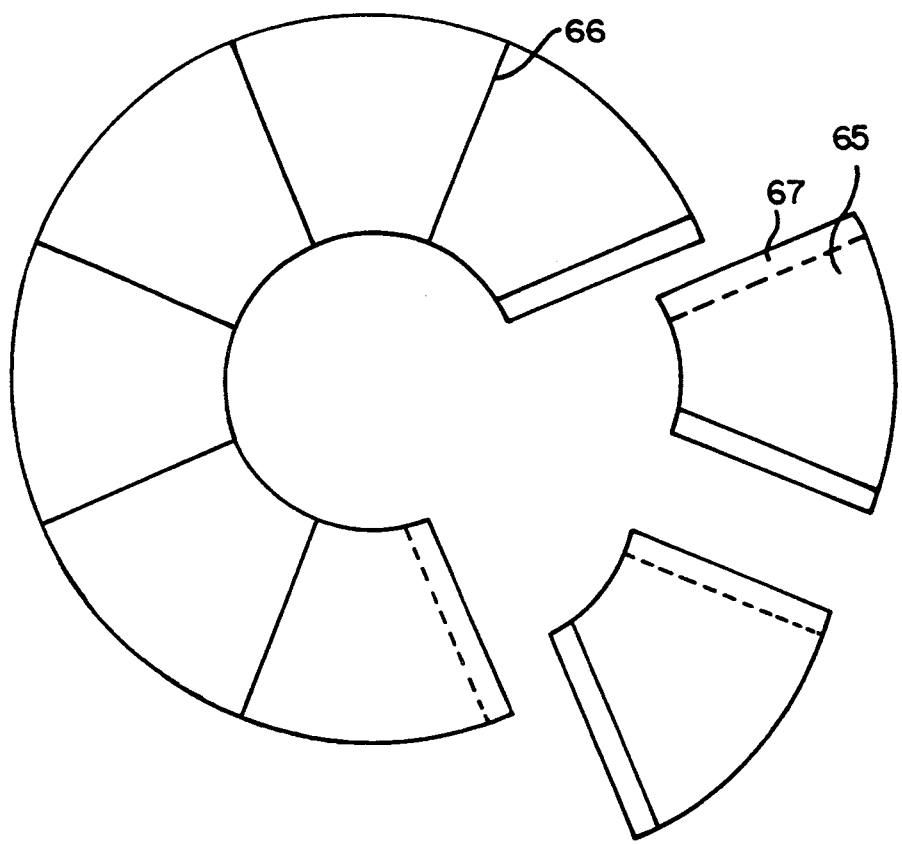

The invention will be explained more fully by the following description of an embodiment of the atomizer wheel, which just serves as an example, with reference to the drawings, in which FIG. 1 shows, partially in axial section, a first embodiment of an atomizer wheel according to the invention mounted on a centrifugal atomizer, of which only the lower part is visible, FIG. 2 is an enlarged view of a fragment of the atomizer wheel shown in FIG. 1, FIG. 3 is an enlarged view of a fragment of a second embodiment of an atomizer wheel according to the invention, FIG. 4 is a perspective view of a wear ring cut into elements, FIG. 5 shows a fragment of a circular section through the wear ring shown in FIG. 4, FIG. 6 is a radial section through a second embodiment of a wear ring, FIG. 7 is a third embodiment of an atomizer wheel according to the invention, and FIG. 8 is a top view of the wear ring associated with the atomizer wheel shown in FIG. 7.

In FIG. 1, a first embodiment of the atomizer wheel is generally designated 1 and the centrifugal atomizer is designated 2. The atomizer wheel 1 substantially comprises a central hub 3, an acceleration chamber 4 defined by a wall 5 having a plurality of throw-out channels 6 evenly distributed along the periphery of the chamber, and a throw-out face 7 which has a discharge edge 8 and extends inwardly from this to an area 9 on the atomizer wheel 1 disposed above the throw-out channels 6. The central hub 3 of the atomizer wheel is screwed on to the shaft 10 of the centrifugal atomizer 2 by means of a nut 11 and an end washer 12. This threaded assembly is moreover protected behind a cover nut 13, which is screwed downwardly into the atomizer wheel with external threads 14.

When the system works, the shaft 10 and thereby the atomizer wheel 1 rotate with a very great velocity, so that the liquid added to the acceleration chamber via feed pipes 15 will be affected by great centrifugal forces pressing the liquid out through the throw-out channels 6 in Jets impinging on the throw-out face 7 with a considerable force, whereupon the liquid is immediately distributed in a coherent product film which is thrown further out by the centrifugal force towards the discharge edge 8 of the throw-out face 7, from which the liquid then leaves the wheel in atomized state because of the great velocity.

The centrifugal forces subject the atomizer wheel to very great mechanical impacts, and atomizer wheels of this type are therefore generally made of a strong stainless steel alloy. There is risk of condensate depositions on the faces of the atomizer wheel in the area outside the throw-out channels 6, since the relatively cold liquid flowing out of the throw-out channels causes the temperature at this point to be at a lower level than in the rest of the space surrounding the atomizer wheel. When working with highly corrosive liquids, the said faces may therefore, as is the case in the shown example, be protected by a special corrosion insert 19, which may e.g. be made of nickel alloys or titanium.

When abrasive liquids are atomized, such as suspensions or dispersions of abrasive materials, e.g. quartz particles or flour, in particular the throw-out channels and the throw-out face are subjected to very great wear, entailing that the wheels just have a short life when using conventional constructions. This drawback is remedied in the atomizer wheel of the invention by lining each throw-out channel 6 with a wear insert 21 of a particularly wear resistant material and providing the throw-out face 7 on a wear ring 22 of the same or another wear resistant material.

This material may e.g. be silicon carbide or aluminum oxide, both of which are materials which have a very great wear resistance, but which on the other hand almost completely lack elongation at break so that the materials are incapable of absorbing tensile stresses.

This entails that the wear ring 22 will rapidly be burst by the centrifugal forces, and, as shown in FIGS. 4 and 5, it is therefore divided in advance into a plurality of wear elements 23 by cuts 34 made through the ring transversely to its peripheral direction. In the shown example, these cuts are made with equidistant angular distances in the ring and extend from its periphery toward a common point on the axis of rotation, so that the ring is divided into uniform wear elements 23. To avoid occurrence of tensile stresses in the elements to the greatest possible extent, the cuts 34 in the ring are moreover laid so closely that the radial extent of each element is greater than its greatest width. As shown best in FIG. 5, the cuts moreover extend obliquely forwardly in the direction of rotation, so that a type of "waternose" 24 is formed on each element above the possible gap 25 that separates two adjacent elements. This entails that the rapid liquid flow across the throw-out face 7 is not impeded by any form of obstacles at the locations where the ring has been cut through.

As shown in FIG. 2, the individual wear elements 23 are positioned loosely side by side in the atomizer wheel 1 and are kept in position in the wheel during the rotation by means of the centrifugal force alone, which is absorbed partly by a support face 26 disposed behind the ring, partly by an inwardly facing rim 27 which supports the outer peripheral edge of the ring with a reaction force. This manner of support means that the elements will be affected by pressure forces alone.

The outer peripheral edge of the wear ring is formed with an annular cut-out 28 with which the wear ring rests on the rim 27. This cut-out 28 is shaped so that the discharge edge 8, which forms the line of intersection between the vertical surface of revolution of the cut-out and the throw-out face 7, will be disposed somewhat below the lower edge of the rim 27, such that the liquid can freely atomize from the discharge edge 8. During assembly, the wear elements are edged into position in the wheel and are fixed loosely in it by means of screws 29, which are screwed down toward the upper edge of the wear ring without touching it however, so that the elements are prevented from falling out when the wheel stands still.

Alternatively, as shown in FIG. 3, the wear elements 23 may be fixed in advance in correct positions by means of a wedge 35 associated with each element 23, said wedge serving to keep the element biassed against the support face 26 and the inwardly facing rim 27. The wedge 35 is placed in a hole 36 in which an insert screw 37 is mounted upwardly. The screw has an internal threaded hole 38 with a screw 39 which is screwed into a threaded hole 40 in the wedge 35. Tightening of the screw 39 causes the wedge 35 to be moved along an inclined face 41 provided upwardly on the element 23 with Such an inclination that the resulting component of force, by which the wedge 35 acts on the element 23, is directed against the support face 26 and the rim 27, so that the element is kept securely fixed in a predetermined position.

If the element 23 is thus clamped in a cold state, i.e. before the atomizer wheel is operated, the element, which consists of a material with a smaller coefficient of expansion than the material of the wheel, will expand less than the wheel and will lie loosely in it in the same manner as described in connection with the mention of FIG. 2, when the wheel in operation is heated by the materials to be atomized. Alternatively, the element may also be clamped when the element and the wheel have been warmed, are e.g. at working temperature or at a temperature between this and room temperature. In a cold state, the element will then be fixed with a suitably great bias effectively securing the position of the element under all conditions of operation. With a view to compensating the difference between the expansions of the element and the wheel upon heating, the wedge 35 may advantageously be resilient. Thus, it may downwardly have the shape of e.g. a leaf spring or be made wholly or partly of an elastomeric material.

A radially extending groove 30 is provided in the rear side of one or more wear rings, and, correspondingly, pins 31 are driven into the corrosion insert 19, engaging with the grooves 30 so that the assembled ring of elements is secured against relative rotation with respect to the atomizer wheel when the velocity of said wheel is changed at e.g. start or stop.

As shown, the wear ring is conical with a diverging conicity in downward direction, and the throw-out face of the ring is moreover adapted such as to extend in parallel with a face containing the axes of the throw-out channels. The liquid jets from the throw-out channels 6 therefore do not hit the throw-out face 7 directly, so that wear on this is minimized to the greatest extent possible.

FIG. 6 shows a radial section through a second embodiment of a wear ring for an atomizer wheel according to the invention. In this case the ring consists of a base which may be made of the same material as the atomizer wheel itself or the corrosion insert 19, and a wear layer 33 which is applied to the base and may be made of the same material as the wear ring previously mentioned. The wear layer may also consist of tungsten carbide that can be sprayed on to the base 32. This structure is particularly inexpensive to manufacture and is moreover particularly burst proof.

FIG. 7 shows a third embodiment of an atomizer wheel which is generally designated 55. In this case the wheel has a central hub 56, an acceleration chamber 57 defined by a wall 58 with throw-out channels 59 in wear inserts 60, and a wear ring 61 positioned in the bottom of the acceleration chamber opposite the ring opening 62, through which the liquid to be atomized is added to the acceleration chamber 57 from a centrifugal atomizer (not shown). The ring opening 62 is provided in a cover ring 63, which is secured to the wheel 55 itself by e.g. screws, and the figure moreover shows a conical ring 64 which is disposed around the hub 56 and is screwed firmly into the bottom of the acceleration chamber to secure the wear ring 61 to this together with the wear inserts 61, whose inner end is positioned immediately above the wear ring. The conical ring 64 may be made of a suitable wear resistant material and serve to protect the hub against wear by the added liquid.

In this embodiment the liquid is thrown out for atomization in the atmosphere from the throw-out channels 59, whereby the throw-out face of the wear ring is subjected to very great wear in the same manner as in the first embodiment, which reduces the life of the wheel in particular when the liquid to be atomized is abrasive, and the wear ring is therefore correspondingly made of a particularly wear resistant material, such as SiC or $Al_2O_3$, and, as shown in FIG. 8, divided into a plurality of elements 65 by cuts 66 made in advance in the ring, which is therefore protected against being burst by the centrifugal forces.

Furthermore, the wear ring 61, which is plane in the shown embodiment, is adapted in a manner similar to the wear ring 22 described in connection with the first embodiment and operates in principle in the same manner. Thus, the wear ring 61 has "waremoses" 67 like the "waremoses" 24 of the wear ring 22 for unobstructed liquid flow passage from one element to the next during the throw-out of the liquid.

When the atomizer wheel rotates, the centrifugal forces drive the elements 65 of the wear ring out toward the inner side of the chamber wall 58, which simultaneously expands somewhat elastically so that the elements are moved axially to and fro when the wheel rotates and is stopped again.

Exemplary embodiments of the atomizer wheel of the invention have been described above. However, the structures may be varied in many ways within the scope of the invention. Thus, instead of being conical or plane, the wear ring may have a shape of double curvature, and the arrangement may moreover be used for any forms of atomizer wheels, which thus must not necessarily be provided with an acceleration chamber and throw-out channels. Thus, a combination of the first and the second embodiment is readily conceivable within the scope of the invention, where a wear plate according to the invention is provided in the acceleration chamber as well as outside it. Nor do the cuts have to extend along the radii of the ring, as shown e.g. in FIG. 8, but may extend in any other suitable manner, provided that the ring is cut through from the outer to the inner periphery.

In all cases, an atomizer wheel, which is constructed like the structure according to the invention, will have a longer service length and a longer life than known before, and to this should be added that the actual wheel can still be used after the wear ring has been worn down, since the wheel is fully operational again after mounting of a new wear ring. These properties are particularly advantageous when the products to be atomized are abrasive.

We claim:

1. An atomizer wheel comprising a central hub for securing the wheel on a rotatable shaft in a centrifugal atomizer associated with an atomizer drying system, a ring-shaped acceleration chamber arranged around the hub and having an upper ring opening through which the liquid to be atomized may be added to the acceleration chamber, at least one throw-out face for passing the liquid outwardly in the atomizer wheel in a direction toward its periphery, and a plurality of throw-out channels which, distributed with a mutual angular distance along the periphery of the acceleration chamber, extend transversely out through the outer wall of the chamber and serve to throw the liquid out of the acceleration chamber during the rotation of the atomizer wheel, wherein at least one throw-out face is provided on a separate wear ring which is provided on the atomizer wheel and comprises a hard and wear resistant material, the wear ring being divided into a plurality of wear elements by cuts that extend from the periphery of the ring substantially in a direction directed to a substantially circular area around the axis of rotation, the cuts extending obliquely forwardly in the direction of rotation from at least one throw-out face of the ring.

2. The atomizer wheel according to claim 1, wherein the radial extent of each wear element is greater than its greatest width.

3. The atomizer wheel according to claim 2, wherein in order top support the wear ring during rotation the atomizer wheel has a support face acting against the rear side of the ring and an inwardly directed face acting against the outer peripheral edge of the ring.

4. The atomizer wheel according to claim 3, wherein the elements of the wear ring are arranged loosely in the atomizer wheel.

5. The atomizer wheel according to claim 4, wherein the elements of the wear ring are kept biased in a direction toward the inwardly directed face by a clamping means.

6. The atomizer wheel according to claim 5, wherein the rear side of the cut-through wear ring is provided with at least one radially extending groove which cooperates with a pin secured in the support face on the atomizer wheel acting against the rear side.

7. The atomizer wheel according to claim 6, wherein said atomizer wheel comprises an inwardly facing ring-shaped wear ring arranged outside the acceleration chamber and having a throw-out face for throwing the liquid in a substantially coherent liquid film from the throw-out channels further out for atomization from a peripherally arranged discharge edge on the throw-out face, said throw-out face extending inwardly from the discharge edge to an area on the atomizer wheel positioned above the exit of a respective throw-out channel.

8. The atomizer wheel according to claim 7, wherein the inwardly directed face acting against the outer peripheral edge of the ring is provided on an inwardly facing rim which engages with an annular substantially V-shaped cut-out, which is provided in the outer peripheral edge of the wear ring and intersects the throw-out face along the discharge edge, said discharge edge being spaced below the lowermost edge of the rim.

9. The atomizer wheel according to claim 8, wherein the cut-through wear ring is composed of a base consisting of a corrosion resistant material and a wear layer which is applied on the substrate and forms the throw-out face and which consists of a hard and wear resistant material.

10. The atomizer wheel of claim 9, wherein said corrosion resistant material is stainless steel and said hard and wear resistant material is selected from the group consisting of silicon carbide, aluminum oxide, and tungsten carbide.

11. The atomizer wheel according to claim 8, wherein at least in the vicinity of the throw-out channels the throw-out face extends in parallel with the longitudinal axis of a respective channel.

12. The atomizer wheel according to claim 5, wherein said atomizer wheel comprises a downwardly facing ring-shaped wear ring arranged outside the acceleration chamber and having a throw-out face for throwing the liquid in a substantially coherent liquid film from the throw-out channels further out for atomization from a peripherally arranged discharge edge on the throw-out face, said throw-out face extending inwardly from the discharge edge to an area on the atomizer wheel positioned above the exit of a respective throw-out channel.

13. The atomizer wheel of claim 1, wherein said wear ring is plate-shaped.

14. The atomizer wheel of claim 1, wherein said hard and wear resistant material is a ceramic material.

15. The atomizer wheel of claim 14, wherein said ceramic material is selected from the group consisting of silicon carbide, aluminum oxide, and tungsten carbide.

16. The atomizer wheel of claim 15, wherein said ceramic material is silicon carbide or aluminum oxide.

17. An atomizer wheel comprising a central hub for securing the wheel on a rotatable shaft in a centrifugal atomizer associated with an atomizer drying system, a ring-shaped acceleration chamber arranged around the hub and having an upper ring opening through which the liquid to be atomized may be added to the acceleration chamber, at least one throw-out face for passing the liquid outwardly in the atomizer wheel in a direction toward its periphery, and a plurality of throw-out channels which, distributed with a mutual angular distance along the periphery of the acceleration chamber, extend transversely out through the outer wall of the chamber and serve to throw the liquid out of the acceleration chamber during the rotation of the atomizer wheel, wherein at least one throw-out face is provided on a separate wear ring which is located in the acceleration chamber and comprises a hard and wear resistant material, the atomizer having a support face acting against a rear side of the ring and and inwardly directed face acting against an outer peripheral edge of the ring in order to support the wear ring during rotation, the wear ring being divided into a plurality of wear elements by cuts that extend from the periphery of the ring substantially in a direction directed to a substantially circular area around the axis of rotation, the cuts extending obliquely forwardly in the direction of rotation from at lest one throw-out face of the ring, the wear elements being loosely arranged in the atomizer ring, and at least one throw-out face is directed toward the upper ring opening.

18. The atomizer wheel according to claim 17, wherein the inwardly directed face acting against the outer peripheral edge of the ring is provided on the inner side of the outer wall of the acceleration chamber.

19. The atomizer wheel according to claim 18, wherein the throw-out face of the wear ring extends substantially from the central hub of the wheel to the inwardly facing end of the throw-out channels.

20. The atomizer wheel of claim 17, wherein the cut-through wear ring is composed of a base consisting of a corrosion resistant material and a wear layer which is applied on the substrate and forms the throw-out face and which consists of a hard and wear resistant material.

21. The atomizer wheel of claim 20, wherein said corrosion resistant material is stainless steel and said hard and wear resistant material is selected from the group consisting of silicon carbide, aluminum oxide, and tungsten carbide.

* * * * *

UNITED STATES PATENT AND TRADEMARK OFFICE
CERTIFICATE OF CORRECTION

PATENT NO. : 5,356,075
DATED : OCTOBER 18, 1994
INVENTOR(S) : MORTEN HEIDE AND HENRIK SONDERBY

It is certified that error appears in the above-identified patent and that said Letters Patent is hereby corrected as shown below:

ON THE TITLE PAGE:

Delete "[22] Filed: Mar. 19, 1993" and substitute therefor to read:

-- [22] PCT Filed: July 9, 1991

[86] PCT No.: PCT/DK91/00198

§ 371 Date: Mar. 19, 1993

§ 102(e) Date: Mar. 19, 1993

[87] PCT Pub. No.: WO92/00788

PCT Pub. Date: Jan. 23, 1992 --.

Column 2, line 30, "Groove" delete the "G" and substitute therefor -- g --;

Column 3, line 47, "Jets" delete the "J" and substitute therefor -- j --;

Column 5, line 1, "Such" delete the "S" and substitute therefor -- s --;

Column 5, line 43, after "base" insert -- 32, --; and

Column 6, lines 17 and 18, delete "waremoses" and substitute therefor -- waternoses --.

UNITED STATES PATENT AND TRADEMARK OFFICE
CERTIFICATE OF CORRECTION

PATENT NO. : 5,356,075
DATED : OCTOBER 18, 1994
INVENTOR(S) : MORTEN HEIDE AND HENRIK SONDERBY

It is certified that error appears in the above-identified patent and that said Letters Patent is hereby corrected as shown below:

Column 7, line 13, delete "top" and substitute therefor -- to --.

Signed and Sealed this

Ninth Day of May, 1995

BRUCE LEHMAN

Attest:

Attesting Officer          Commissioner of Patents and Trademarks